US012648541B1

(12) United States Patent
Gutierrez

(10) Patent No.: US 12,648,541 B1
(45) Date of Patent: Jun. 9, 2026

(54) CRYOGENIC LIQUID-BASED COOLING SYSTEM FOR COLOSTRUM, TRANSITION MILK AND MATURE MILK IN LIVESTOCK SPECIES

(71) Applicant: Fernando Orozco Gutierrez, Holyoke, CO (US)

(72) Inventor: Fernando Orozco Gutierrez, Holyoke, CO (US)

( * ) Notice: Subject to any disclaimer, the term of this patent is extended or adjusted under 35 U.S.C. 154(b) by 0 days.

(21) Appl. No.: 19/390,591

(22) Filed: Nov. 16, 2025

(51) Int. Cl.
| | |
|---|---|
| *A01J 9/04* | (2006.01) |
| *A01J 9/02* | (2006.01) |
| *F25B 7/00* | (2006.01) |
| *F25D 11/02* | (2006.01) |
| *F25B 39/02* | (2006.01) |
| *F25D 29/00* | (2006.01) |

(52) U.S. Cl.
CPC . *A01J 9/04* (2013.01); *A01J 9/02* (2013.01); *F25B 7/00* (2013.01); *F25B 39/022* (2013.01); *F25D 11/022* (2013.01); *F25D 29/00* (2013.01)

(58) Field of Classification Search
CPC ...... F25D 29/00; F25D 11/022; F25B 39/022; F25B 7/00; A01J 9/02; A01J 9/04
See application file for complete search history.

(56) References Cited

U.S. PATENT DOCUMENTS

| | | | | |
|---|---|---|---|---|
| 5,701,753 A | * | 12/1997 | Iritani | B60H 1/3205 |
| | | | | 62/211 |
| 6,131,398 A | * | 10/2000 | Versteijnen | F25B 5/02 |
| | | | | 62/99 |
| 8,042,608 B2 | * | 10/2011 | Baker | F28D 15/00 |
| | | | | 165/165 |
| 10,266,385 B2 | * | 4/2019 | Lee | F28D 7/02 |
| 2005/0183428 A1 | * | 8/2005 | Gruber | A01J 9/04 |
| | | | | 62/99 |
| 2006/0196631 A1 | * | 9/2006 | Small | F25D 16/00 |
| | | | | 165/10 |
| 2017/0150695 A1 | * | 6/2017 | Meillan | A01J 5/01 |
| 2020/0008389 A1 | * | 1/2020 | Stopa | A23B 11/14 |
| 2023/0320311 A1 | * | 10/2023 | Van Eeden | A01J 5/0134 |
| | | | | 119/14.01 |

* cited by examiner

*Primary Examiner* — Ana M Vazquez
(74) *Attorney, Agent, or Firm* — Ruben Alcoba, Esq.

(57) ABSTRACT

A cryogenic liquid-based rapid cooling system for colostrum is provided, configured to rapidly cool the colostrum while preserving its bioactive properties. The system includes a cryogenic thermal source containing a cryogenic liquid, a heat exchanger assembly with first and second heat exchangers arranged in series, a colostrum flux system, a colostrum storage tank, and an electronic control system. The first heat exchanger is thermally coupled to the cryogenic thermal source and rapidly cools a water-based liquid, and the second heat exchanger rapidly cools the colostrum using the cooled water-based liquid from the first heat exchanger. The colostrum flux system homogenizes and circulates the colostrum at a controlled flow rate to achieve homogeneous cooling and prevent freezing. The electronic control system monitors and regulates performance through distributed sensors and actuators for efficient operation. The system may be portable and function autonomously, allowing operation in diverse farming environments even without electricity.

20 Claims, 4 Drawing Sheets

Portable System Configuration

System Schematic

Cryogenic Liquid

Water-based Liquid

Colostrum

Conduit Network

Plurality of Sensors

Plurality of Actuators

CRYOGENIC LIQUID-BASED COOLING SYSTEM FOR COLOSTRUM, TRANSITION MILK AND MATURE MILK IN LIVESTOCK SPECIES

BACKGROUND

Colostrum in dairy livestock species is the first milk produced immediately after parturition by cattle and other dairy livestock species including but not limited to bison, buffalo, yaks, sheep and goats. The colostrum contains essential bioactive components that provide passive immunological protection to the neonate during its first hours of life, while its own immune system matures to respond to environmental challenges. Due to its high biological value and sensitivity, colostrum requires rapid and efficient cooling immediately after extraction to preserve its immunological and nutritional properties, including immunoglobulins, enzymes, and growth factors that are highly susceptible to thermal degradation.

Following the production of colostrum, cattle and other dairy livestock species produce transition milk—characterized by high biological value and sensitivity—which subsequently develops into mature milk. The precise moment when colostrum transitions to mature milk is difficult to define, as this process varies among animals. It is not uncommon for dairy livestock to produce mature milk directly without an intermediate transition stage, or to remain for an extended period producing colostrum or transition milk. Furthermore, ongoing research explores the potential benefits of combining, mixing, or phasing these three types of milk during the first days or weeks of the neonate's life. Accordingly, the invention disclosed herein is applicable to all three milk types, which are collectively referred to as colostrum throughout this application, including the claims. The following discussion focus on cattle dairy farms for illustrative purposes; however, the principles described herein are applicable to dairy farms of other dairy livestock species.

Conventional colostrum cooling methods, such as standard milk cooling tanks or mechanical chillers, are generally slow and may not achieve the rapid temperature reduction necessary to prevent bacterial growth and preserve the bioactive integrity of the colostrum. Furthermore, such systems are typically designed for bulk milk cooling in centralized dairy operations, rather than for localized and immediate cooling of colostrum at the time and place of milking.

In typical dairy farm operations, colostrum is obtained when a cow is milked for the first or second time after calving. Unlike regular production cows, which are connected to the main milk line, freshly calved cows are milked separately. During this process, the existing vacuum milking system is disconnected from the main milk line, and a separate collection setup is used to allow the colostrum to flow into a designated container or bucket. To maintain the quality of the colostrum, cooling must be initiated immediately after extraction, as even short delays at ambient temperatures can lead to degradation of critical bioactive compounds.

Additionally, the analysis of colostrum quality plays a crucial role in providing traceability and enabling the identification of anomalies or deviations in its composition. Such analysis is valuable not only for immediate quality control but also for research purposes, for supporting future decision-making, and for facilitating adjustments in herd management practices or detection of procedural errors. However, the industry lacks systems for continuous, automated monitoring of the colostrum's quality during the extraction and cooling process, which is essential for obtaining accurate and reliable analytical data.

Accordingly, there is a need for a cooling system capable of achieving ultra-fast heat transfer rates that are not attainable with conventional cooling methos, and that provides immediate, efficient and portable means to rapidly cool the colostrum directly at the point of extraction to enable on-site preservation of colostrum's immunological quality, even in environments lacking electrical infrastructure or centralized refrigeration systems. Furthermore, the cooling system should incorporate continuous analytical monitoring capabilities to improve both the traceability and safety of colostrum handling in dairy operations.

SUMMARY

The present disclosure relates to a cryogenic liquid-based rapid cooling system specifically designed for cooling colostrum immediately after extraction. The system integrates a cryogenic thermal source, a dual-stage heat exchanger assembly, a colostrum flux system, a colostrum storage tank, and an electronic control system to achieve ultra-fast cooling and preserve the bioactive and immunological properties of colostrum.

The cryogenic thermal source includes a cryogenic liquid reservoir containing a cryogenic liquid, preferably liquid nitrogen, which serves as the primary cooling agent. The reservoir features thermally conductive walls that enable efficient heat absorption from a surrounding medium, preferably composed of a sand-based material. The heat exchanger assembly comprises a first heat exchanger thermally coupled to this medium and positioned at a distance preferably between about 8 cm and 12 cm from the thermally conductive walls of the cryogenic thermal source, configured to cool a water-based liquid, and a second heat exchanger arranged in series to transfer the cooling energy from the water-based liquid to the colostrum.

The water-based liquid must reach a temperature between about −8° C. and −12° C. as it enters the second heat exchanger to effectively cool the colostrum from approximately 38° C. at the moment of extraction to between about 1° C. and 4° C.—an optimal temperature range to prevent bacterial growth and preserve quality. Direct use of the cryogenic liquid in the second heat exchanger would cause excessive thermal shock, leading to colostrum freezing. Given that liquid nitrogen typically ranges between about −184° C. and −196° C., such direct use would also require additional equipment to temper the cryogenic liquid, increasing system complexity and cost. Moreover, a direct cryogenic setup would necessitate highly specialized tanks, valves and pumps, which demand careful operation to prevent hazards such as asphyxiation or explosion. The proposed layered heat transfer configuration (cryogenic thermal source—sand-based medium—water-based liquid—colostrum) reduces system complexity and safety risks, enhances reliability by minimizing the number of sensitive components, and maintains high cooling effectiveness and efficiency.

The colostrum flux system is configured to circulate the colostrum through the system, homogenize it before cooling, and maintain a substantially constant flow rate between about 1.5 L/min and 2.5 L/min during the cooling process. This controlled flow ensures homogeneous thermal transfer and prevents freezing. The flux system may include a receiver for agitation, a filtration unit for removing solid contaminants, and a peristaltic pump for low-shear circulation. The colostrum storage tank features a double-walled design with a refrigerant flux to maintain the desired storage temperature after cooling.

The electronic control system includes at least one controller with data acquisition and processing capabilities, configured to process input from multiple sensors and actuate key system components. The sensors may monitor electrical conductivity, temperature, immunoglobulin concentration, blood content, density, and color of the colostrum, as well as temperature of the cooling liquid, thereby allowing real-time monitoring, traceability, and quality analysis. The control system may further include a user interface with an integrated encoder for manual or automated operation, and the system can operate autonomously, even in environments lacking access to electricity.

The primary objective of the present system is to provide an efficient, portable, and autonomous cryogenic cooling solution capable of achieving rapid temperature reduction of colostrum at the point of extraction, thereby preserving its immunological quality, enabling on-site analysis and traceability, and overcoming the limitations of conventional milk-cooling technologies.

BRIEF DESCRIPTION OF THE DRAWINGS

These and other features, aspects, and advantages of the present invention will become better understood with regards to the following description, appended claims, and drawings where:

DESCRIPTION

Figure 1:
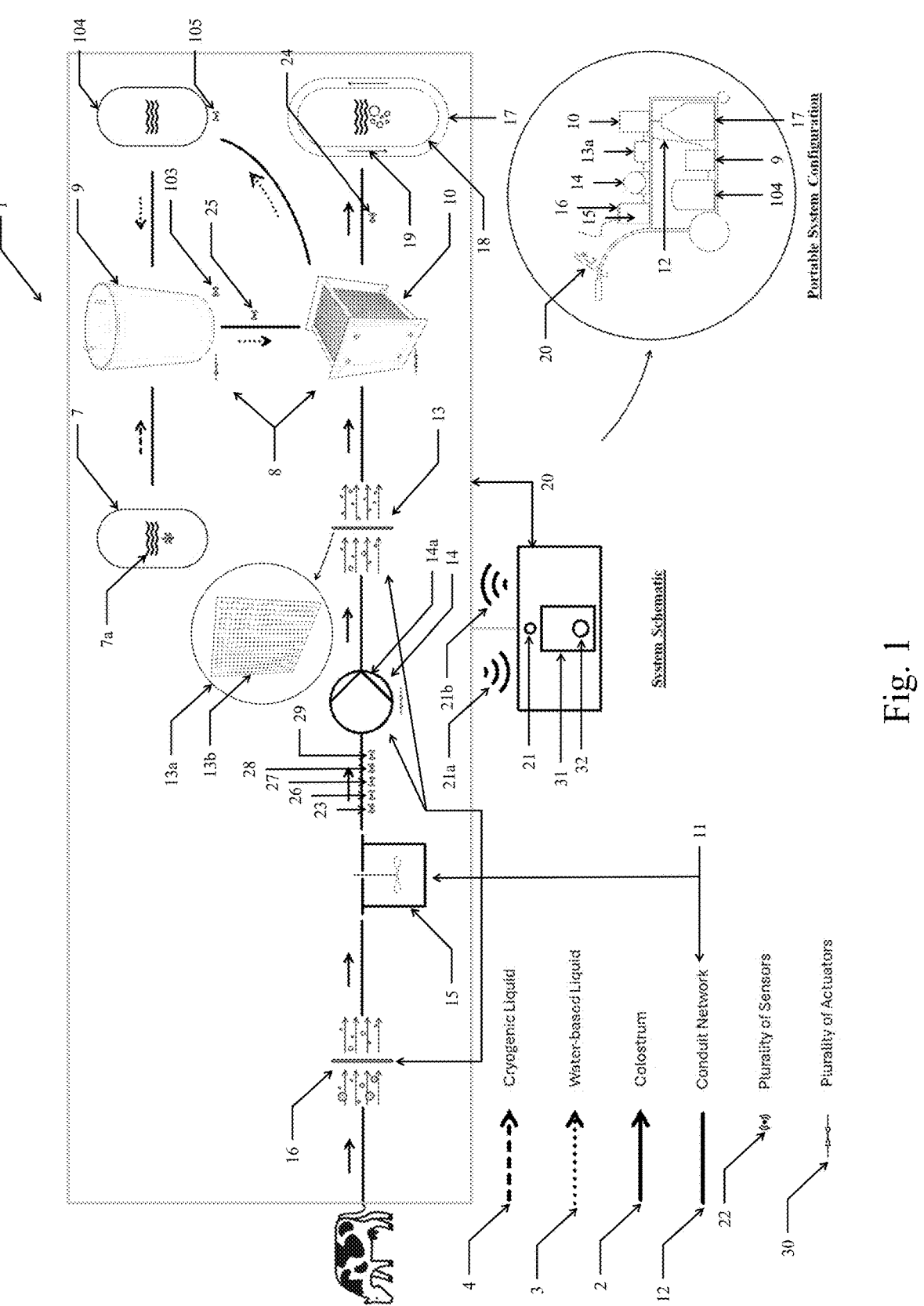
FIG. 1 is a schematic view of the present invention.
Figure 2:
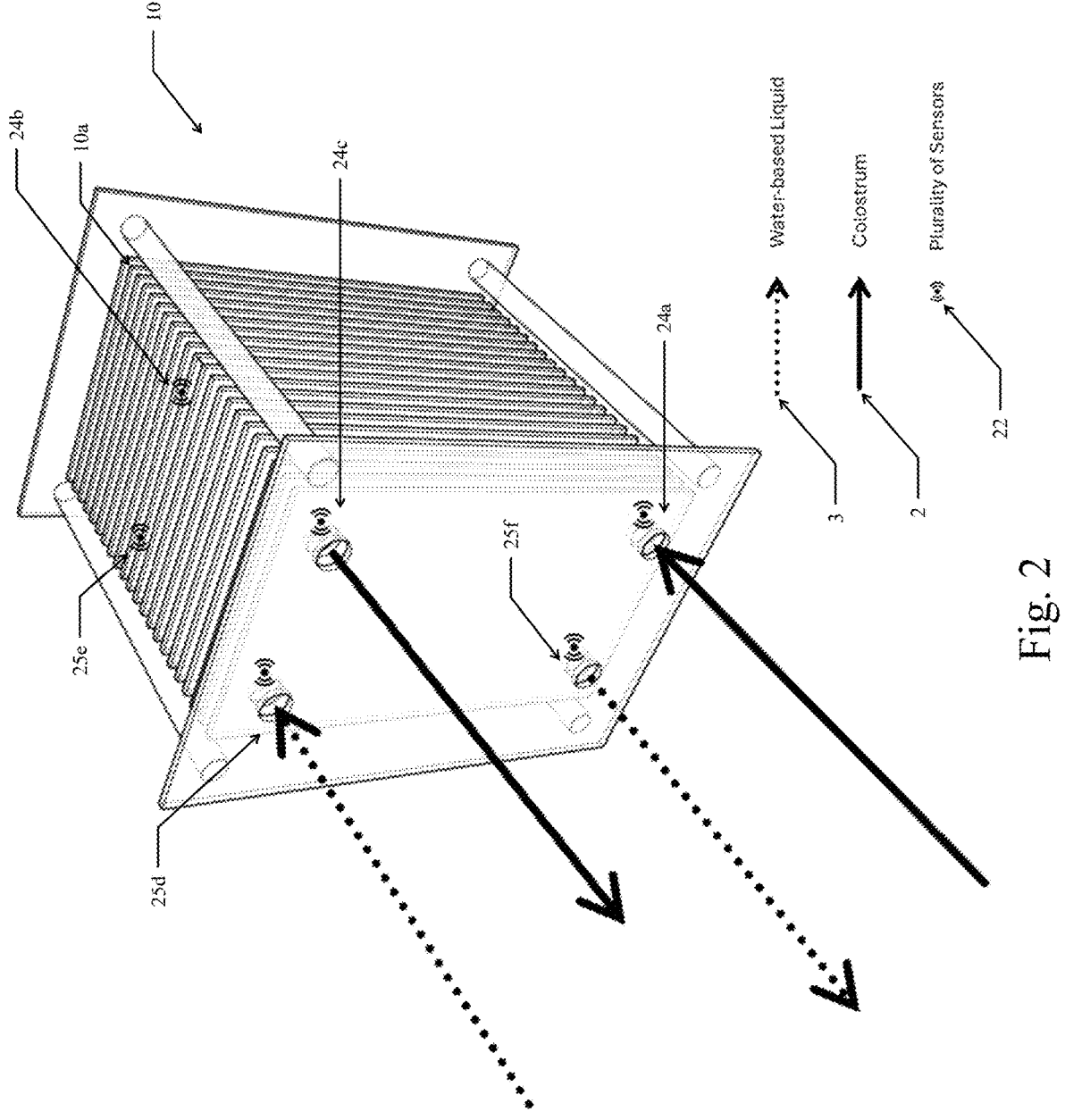
FIG. 2 is a perspective view of the second heat exchanger.
Figure 3:
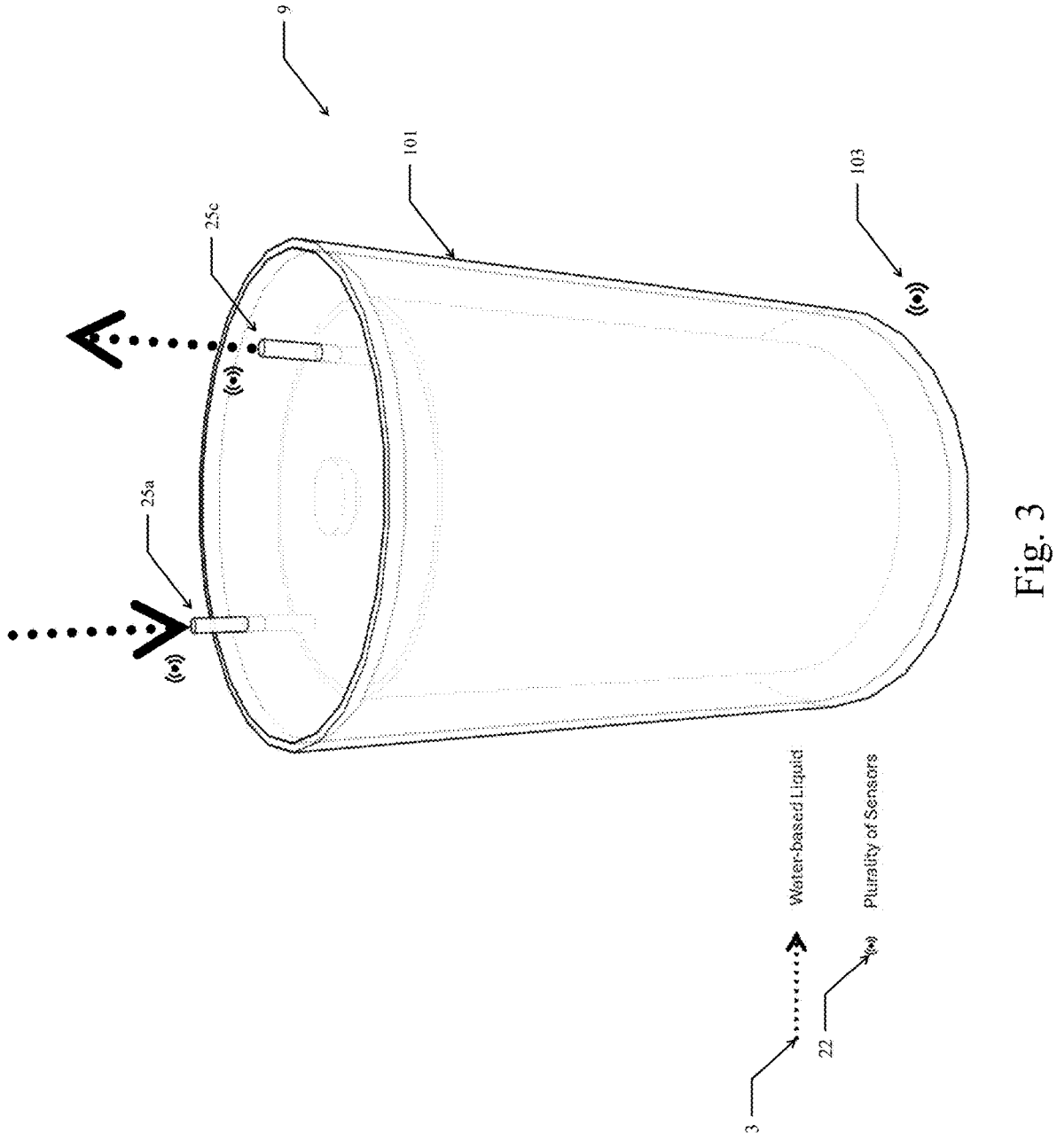
FIG. 3 is a perspective view of the first heat exchanger.
Figure 4:
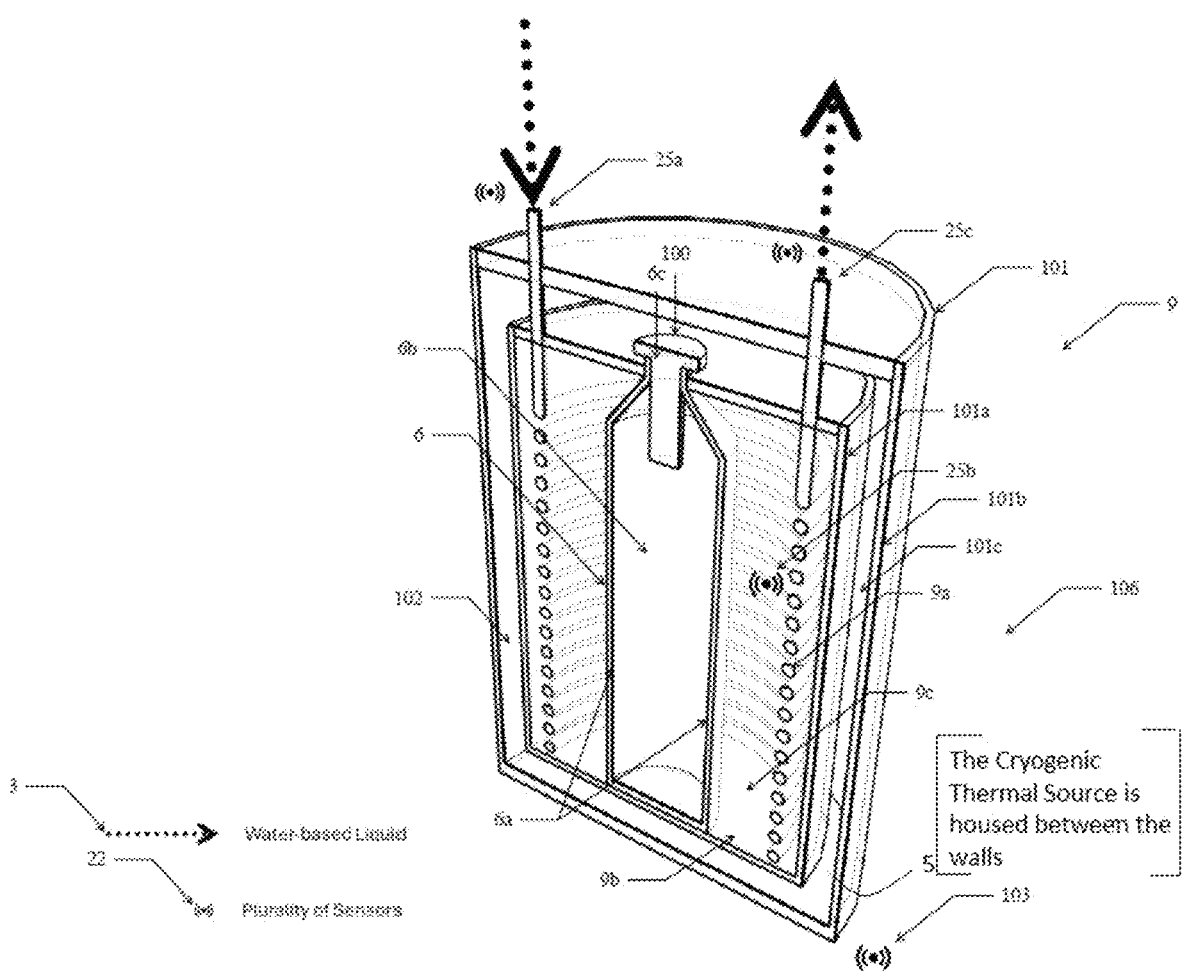
FIG. 4 is a cross-sectional perspective view of the first heat exchanger.

As seen in FIGS. 1-4, the present invention is a cryogenic liquid-based rapid cooling system 1 for colostrum, hereinafter referred to as the system 1, configured to rapidly cool a colostrum 2 and ensure the preservation of its bioactive properties. The system 1 comprises a cryogenic thermal source 5, a heat exchanger assembly 8, a colostrum flux system 11, a colostrum storage tank 17, a water based liquid tank 104 containing a water-based liquid 3, and an electronic control system 20. Wherein the cryogenic thermal source 5 is defined by a cryogenic liquid reservoir 6 configured to absorb heat from a medium 9b surrounding the cryogenic thermal source 5, the cryogenic liquid reservoir 6 has thermally conductive walls 6a that collectively define an interior cavity 6b configured to contain a cryogenic liquid 4, and a removable lid 100 that seals an inlet 6c to the cryogenic liquid reservoir 6. Wherein the heat exchanger assembly 8 has a first heat exchanger 9 and a second heat exchanger 10 arranged in series, the first heat exchanger 9 is thermally coupled to the medium 9b surrounding the cryogenic thermal source 5 and is configured to rapidly cool the water-based liquid 3, which is pumped from the water-based liquid tank 104 (the pump is not shown in the drawings for clarity), a double-walled thermally insulative tank 101 having an inner wall 101a, an outer wall 101b and a space 101c between the inner wall 101a and the outer wall 101b is configured to encase the cryogenic thermal source 5, the medium 9b surrounding the cryogenic thermal source 5, and the first heat exchanger 9 to thermally isolate them from an environment 106 and thereby enhancing operational efficiency, the second heat exchanger 10 is configured to rapidly cool the colostrum 2 using the cooled water-based liquid 3 from the first heat exchanger 9, the water-based liquid 3 is recirculated back to the water-based liquid tank 104 after being used in the second heat exchanger 10. Wherein the colostrum flux system 11 has a conduit network 12 for circulating the colostrum 2 throughout the system 1, a homogenization mechanism 13 configured to drive the colostrum 2 through a homogenization filter 13a that breaks down larger colostrum fat particles before cooling, thereby rendering the colostrum 2 uniform in composition and consistency, and at least one pump 14 configured to drive the colostrum 2 through the second heat exchanger 10 and to the colostrum storage tank 17 after cooling at a low, substantially constant flow rate, which enables homogeneous cooling and prevents freezing of the colostrum 2. And, wherein the electronic control system 20 continuously monitors the performance and controls the operation of the system 1 through at least one controller 21 with data acquisition and processing capabilities, which is configured to process input signals 21a from a plurality of sensors 22 and deliver control signals 21b to a plurality of actuators 30, the plurality of sensors 22 is distributed along the system 1 for extensive, real-time performance monitoring, the plurality of actuators 30 controls the operation of at least the heat exchanger assembly 8 and the colostrum flux system 11.

In an embodiment of the present invention, the plurality of sensors 22 comprises one or more of a colostrum electrical conductivity sensor 23, a colostrum temperature sensor 24, a water-based liquid temperature sensor 25, a colostrum immunoglobulin concentration sensor 26, a colostrum blood detection sensor 27, a colostrum density sensor 28, a colostrum color sensor 29, a weight sensor 103 that is configured to measure the weight of the cryogenic liquid reservoir 6 to monitor the level of the cryogenic liquid 4, and a water-based liquid level sensor 105. The weight sensor 103 is intended to be indicative of the quantity of cryogenic liquid 4 within the cryogenic liquid reservoir 6. This information helps ensure that there is no lack of cryogenic liquid 4 at any given time during a milking operation.

In another embodiment of the present invention, a colostrum temperature sensor 24 is installed at an entry 24a to the second heat exchanger 10, a location 24b within the second heat exchanger 10, and at an exit 24c from the second heat exchanger 10.

In another embodiment of the present invention, a water-based liquid temperature sensor 25 is installed at an entry 25a to the first heat exchanger 9, a location 25b within the first heat exchanger 9, at an exit 25c from the first heat exchanger 9, at an entry 25d to the second heat exchanger 10, a location 25e within the second heat exchanger 10, and at an exit 25f from the second heat exchanger 10.

In another embodiment of the present invention, the colostrum flux system 11 includes a receiver 15 upstream of the homogenization mechanism 13, configured to agitate the colostrum 2 to prevent sedimentation of colostrum fat particles prior to pumping.

In another embodiment of the present invention, the colostrum flux system 11 includes a filtration unit 16 upstream of the receiver 15, configured to remove coarse contaminants, including but not limited to manure particles, straw, hey, grass and other solid impurities potentially present in the colostrum 2 at the time of extraction.

In another embodiment of the present invention, the system 1 is configured to be portable, thereby allowing operation in diverse farming environments.

In another embodiment of the present invention, the second heat exchanger 10 cools the colostrum 2 to a temperature between about 1° C. and 4° C.

In another embodiment of the present invention, the colostrum flux system 11 is configured to drive the colostrum 2 through the second heat exchanger 10 and to the colostrum storage tank 17 after cooling at a substantially constant flow rate between about 1.5 L/min and 2.5 L/min.

In another embodiment of the present invention, the cryogenic liquid 4 contained in the cryogenic liquid reservoir 6 is liquid nitrogen maintained at a temperature between about –184° C. and –196° C., and the thermally conductive walls 6a are at least partially made of aluminum, copper or stainless steel.

In another embodiment of the present invention, the water-based liquid 3 comprises glycol to prevent freezing during cooling and is maintained at a temperature between about –8° C. and –12° C. as it enters the second heat exchanger 10. Glycol evaporates over time, thereby potentially introducing air into the first heat exchanger 9 and thus reducing cooling efficiency. The water-based liquid level sensor 105 is intended to identify drops in the water-based liquid level that may be indicative of glycol evaporation, which should be followed by replenishment of the water-based liquid tank 104 to maintain operational efficiency. The double-walled insulative tank 101 is made of a plastic material or a metallic material and comprises an insulative material 102 within the space 101c between the inner wall 101a and the outer wall 101b, the insulative material 102 is an expanded polyurethane when the double-walled insulative tank 101 is made of the plastic material, or gaseous nitrogen when the double-walled insulative tank 101 is made of the metallic material. When the double-walled insulative tank 101 is made of the metallic material, partial vacuum may also be generated within the space 101c between the inner wall 101a and the outer wall 101b to enhance insulation.

In another embodiment of the present invention, the cryogenic liquid 4 contained in the cryogenic liquid reservoir 6 is supplied from an external cryogenic tank 7 in which a bulk cryogenic liquid 7a is stored.

In another embodiment of the present invention, the first heat exchanger 9 is a serpentine heat exchanger 9a.

In another embodiment of the present invention, the second heat exchanger 10 is a plate heat exchanger 10a.

In another embodiment of the present invention, the medium 9b surrounding the cryogenic thermal source 5 is a sand-based material 9c, and the first heat exchanger 9 is maintained at a distance from the cryogenic thermal source between about 8 cm and 12 cm.

In another embodiment of the present invention, the homogenization filter 13a consists of a microfiltration perforated plate 13b.

In another embodiment of the present invention, the at least one pump 14 consists of a peristaltic pump 14a.

In another embodiment of the present invention, the colostrum storage tank 17 comprises a double-walled construction 18 with a refrigerant flux 19.

In another embodiment of the present invention, the electronic control system 20 comprises a user interface 31 with an integrated encoder 32 configured to facilitate performance monitoring and operation control of the system 1.

In yet another embodiment of the present invention, the system 1 is configured to function autonomously for use in scenarios lacking access to electricity.

An advantage of the present invention is that it enables rapid and homogeneous cooling of colostrum using a cryogenic liquid-based system, ensuring that the bioactive properties of the colostrum—such as immunoglobulins and enzymes—are preserved. By minimizing the time the colostrum remains at elevated temperatures, the system effectively prevents bacterial proliferation and quality degradation.

Another advantage of the present invention is that it employs a dual-stage heat exchanger assembly, in which a water-based liquid is first cooled by the cryogenic thermal source and then used to cool the colostrum. This configuration optimizes heat transfer efficiency while reducing direct exposure of the colostrum to cryogenic temperatures, thereby preventing freezing and maintaining product integrity.

Another advantage of the present invention is that it provides precise control and automation through an electronic control system incorporating sensors and actuators distributed throughout the system. This allows real-time monitoring and adjustment of key parameters such as temperature, flow rate, and colostrum quality indicators, ensuring consistent and reliable operation.

Another advantage of the present invention is that the colostrum flux system includes a homogenization mechanism that maintains the uniformity of the colostrum composition and thus facilitates homogeneous cooling, thereby improving storage stability and post-cooling handling characteristics.

Still another advantage of the present invention is that the system is portable and capable of autonomous operation, allowing its use in diverse farming environments, including remote or off-grid environments without access to electricity. This enhances its practicality and adaptability for on-farm applications, particularly in rural or resource-limited settings where rapid cooling of colostrum is critical to maintaining neonate health.

The embodiments of the cryogenic liquid-based cooling system for colostrum herein are exemplary and numerous modifications, combinations, variations, and rearrangements can be readily envisioned to achieve an equivalent result, all of which are intended to be embraced within the scope of the appended claims. Further, nothing in the above-provided discussions of the cryogenic liquid-based system for colostrum should be construed as limiting the invention to an embodiment or a combination of embodiments. The scope of the invention is defined by the description, drawings, and claims.

What is claimed is:

1. A cryogenic liquid-based rapid cooling system for colostrum, hereinafter referred to as the system, configured to rapidly cool a colostrum and ensure a preservation of its bioactive properties, the system comprises:
   a cryogenic thermal source, a heat exchanger assembly, a colostrum flux system, a colostrum storage tank, a water-based liquid tank containing a water-based liquid, and an electronic control system;
   wherein the cryogenic thermal source is defined by a cryogenic liquid reservoir configured to absorb heat from a medium surrounding the cryogenic thermal source, the cryogenic liquid reservoir has thermally conductive walls that collectively define an interior cavity configured to contain a cryogenic liquid, and a removable lid that seals an inlet to the cryogenic liquid reservoir;
   wherein the heat exchanger assembly has a first heat exchanger and a second heat exchanger arranged in series, the first heat exchanger is thermally coupled to the medium surrounding the cryogenic thermal source and is configured to rapidly cool the water-based liquid, a double-walled thermally insulative tank having an inner wall, an outer wall and a space between the inner wall and the outer wall is configured to encase the cryogenic thermal source, the medium surrounding the cryogenic thermal source, and the first heat exchanger to thermally isolate them from an environment and thereby enhancing operational efficiency, the second heat exchanger is configured to rapidly cool the colostrum using the cooled water-based liquid from the first heat exchanger;

wherein the colostrum flux system has a conduit network for circulating the colostrum throughout the system, a homogenization filter that breaks down larger colostrum fat particles before cooling, thereby rendering the colostrum uniform in composition and consistency, and at least one pump configured to drive the colostrum through the second heat exchanger and to the colostrum storage tank after cooling at a low, substantially constant flow rate, which enables homogeneous cooling and prevents freezing of the colostrum; and wherein the electronic control system continuously monitors a performance and controls an operation of the system through at least one controller with data acquisition and processing capabilities, which is configured to process input signals from a plurality of sensors and deliver control signals to a plurality of actuators, the plurality of sensors is distributed along the system for extensive, real-time performance monitoring, the plurality of actuators controls an operation of at least the heat exchanger assembly and the colostrum flux system.

2. The cryogenic liquid-based rapid cooling system of claim 1, wherein the plurality of sensors comprises one or more of a colostrum electrical conductivity sensor, a colostrum temperature sensor, a water-based liquid temperature sensor, a colostrum immunoglobulin concentration sensor, a colostrum blood detection sensor, a colostrum density sensor, a colostrum color sensor, a weight sensor that is configured to measure a weight of the cryogenic liquid reservoir to monitor a level of the cryogenic liquid, and a water-based liquid level sensor.

3. The cryogenic liquid-based rapid cooling system of claim 2, wherein a colostrum temperature sensor is installed at an entry to the second heat exchanger, a location within the second heat exchanger, and at an exit from the second heat exchanger.

4. The cryogenic liquid-based rapid cooling system of claim 2, wherein a water-based liquid temperature sensor is installed at an entry to the first heat exchanger, a location within the first heat exchanger, at an exit from the first heat exchanger, at an entry to the second heat exchanger, a location within the second heat exchanger, and at an exit from the second heat exchanger.

5. The cryogenic liquid-based rapid cooling system of claim 1, wherein the colostrum flux system includes a receiver upstream of the homogenization mechanism, configured to agitate the colostrum to prevent sedimentation of colostrum fat particles prior to pumping.

6. The cryogenic liquid-based rapid cooling system of claim 5, wherein the colostrum flux system includes a filtration unit upstream of the receiver, configured to remove coarse contaminants, including but not limited to manure particles, straw, hey, grass and other solid impurities potentially present in the colostrum at a time of extraction.

7. The cryogenic liquid-based rapid cooling system of claim 1, wherein the system is configured to be portable, thereby allowing operation in diverse farming environments.

8. The cryogenic liquid-based rapid cooling system of claim 1, wherein the second heat exchanger cools the colostrum to a temperature between about 1° C. and 4° C.

9. The cryogenic liquid-based rapid cooling system of claim 1, wherein the colostrum flux system is configured to drive the colostrum through the second heat exchanger and to the colostrum storage tank after cooling at a substantially constant flow rate between about 1.5 L/min and 2.5 L/min.

10. The cryogenic liquid-based rapid cooling system of claim 1, wherein the cryogenic liquid contained in the cryogenic liquid reservoir is liquid nitrogen maintained at a temperature between about −184° C. and −196° C., and wherein the thermally conductive walls are at least partially made of aluminum, copper or stainless steel.

11. The cryogenic liquid-based rapid cooling system of claim 1, wherein the water-based liquid comprises glycol to prevent freezing during cooling and is maintained at a temperature between about −8° C. and −12° C. as it enters the second heat exchanger, and wherein the double-walled insulative tank is made of a plastic material or a metallic material and comprises an insulative material within the space between the inner wall and the outer wall, the insulative material is an expanded polyurethane when the double-walled insulative tank is made of the plastic material, or gaseous nitrogen when the double-walled insulative tank is made of the metallic material.

12. The cryogenic liquid-based rapid cooling system of claim 1, wherein the cryogenic liquid contained in the cryogenic liquid reservoir is supplied from an external cryogenic tank in which a bulk cryogenic liquid is stored.

13. The cryogenic liquid-based rapid cooling system of claim 1, wherein the first heat exchanger is a serpentine heat exchanger.

14. The cryogenic liquid-based rapid cooling system of claim 1, wherein the second heat exchanger is a plate heat exchanger.

15. The cryogenic liquid-based rapid cooling system of claim 1, wherein the medium surrounding the cryogenic thermal source is a sand-based material, and the first heat exchanger is maintained at a distance from the cryogenic thermal source between about 8 cm and 12 cm.

16. The cryogenic liquid-based rapid cooling system of claim 1, wherein the homogenization filter consists of a microfiltration perforated plate.

17. The cryogenic liquid-based rapid cooling system of claim 1, wherein the at least one pump consists of a peristaltic pump.

18. The cryogenic liquid-based rapid cooling system of claim 1, wherein the colostrum storage tank comprises a double-walled construction with a refrigerant flux.

19. The cryogenic liquid-based rapid cooling system of claim 1, wherein the electronic control system comprises a user interface with an integrated encoder configured to facilitate performance monitoring and operation control of the system.

20. The cryogenic liquid-based rapid cooling system of claim 1, wherein the system is configured to function autonomously for use in scenarios lacking access to electricity.

* * * * *